(12) United States Patent
Domzalski

(10) Patent No.: US 7,271,359 B2
(45) Date of Patent: Sep. 18, 2007

(54) FLOAT SWITCH ASSEMBLY

(75) Inventor: Frank Mark Domzalski, Wellesley, MA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 90 days.

(21) Appl. No.: 11/254,274

(22) Filed: Oct. 20, 2005

(65) Prior Publication Data
US 2007/0089974 A1    Apr. 26, 2007

(51) Int. Cl.
*H01H 35/18* (2006.01)
(52) U.S. Cl. .................................... 200/84 R
(58) Field of Classification Search ............... 200/61.2, 200/61.21, 84 R–84 C; 73/305–309, 317, 73/322.5
See application file for complete search history.

(56) References Cited

U.S. PATENT DOCUMENTS

| | | | | |
|---|---|---|---|---|
| 2,792,467 A | * | 5/1957 | Hollinshead | 200/84 R |
| 2,878,335 A | * | 3/1959 | Vitu | 200/84 R |
| 3,254,170 A | * | 5/1966 | Hill | 200/84 B |
| 3,686,451 A | * | 8/1972 | Pottharst, Jr. | 200/84 R |
| 4,521,652 A | * | 6/1985 | Durand | 200/84 B |
| 4,916,274 A | * | 4/1990 | Hawley et al. | 200/457 |
| 5,555,972 A | | 9/1996 | Schwab | |
| 6,737,597 B1 | * | 5/2004 | Galpchian | 200/405 |

* cited by examiner

*Primary Examiner*—Michael A Friedhofer
(74) *Attorney, Agent, or Firm*—Peter Van Winkle

(57) ABSTRACT

A fluid height sensor (10) includes a float (14) with an arm (20) fixed to a shaft (40) that extends into a cavity (30) in a housing (12). A switch assembly (32) in the housing includes a switch (50) formed by a largely stationary blade (52) and by a moveable switch blade (54) that moves forward (F) and rearward (R), respectively against and away from the stationary blade. The switch assembly also includes an activator (56) for snapping the switch blade as the shaft pivots back and forth. The activator (56) includes an activation blade (58) that is moved back and forth by the shaft, and a leaf spring (90) that extends in a loop between the outer ends of the activation blade and of the switch blade. The leaf spring compresses the switch blade by urging its outer end (74) towards its inner end (72), to cause the moveable blade to overshoot when it passes a center position in its forward and rearward movement. Only one end of the shaft projects into the housing cavity, so only one shaft end has to be sealed, the other arm (22) of the float being pivotally mounted on the outside of the housing.

10 Claims, 2 Drawing Sheets

FLOAT SWITCH ASSEMBLY

BACKGROUND OF THE INVENTION

Small fluid height sensors are commonly used to control the flow of electricity to pumps that pump out water when the water level rises to a predetermined level, and to stop such electricity flow when the water level falls below a predetermined level. Such pumps are widely used in marine applications to operate bilge pumps, and in buildings to operate sump pumps. A typical small height sensor includes a float that pivots on a housing, the housing containing a switch that is operated by a shaft that pivotally supports the float and that pivots when the float pivots. The cost and complexity of the fluid height sensor can be reduced by passing electricity that operates a pump motor, directly though a mechanical switch that lies in the housing. However, many pump motors draw considerable amperage; for example, one type of bilge pump operates at 14 volts and 20 amperes. A small switch in a small fluid level sensor must have rapidly closing and opening contacts to minimize spark damage. Such spark damage occurs from sparks that bridge small gaps that exist during switch closing and opening. Switches with mercury that bridges contacts when the switch tilts have been used, but they are often not acceptable because of the presence of mercury. A low cost and simple switch assembly for a small fluid height sensor, which had a long lifetime of use despite large motor current flowing directly though the switch assembly, would be of value.

SUMMARY OF THE INVENTION

In accordance with one embodiment of the invention, a simple and low cost fluid height sensor is provided, that has a long useable lifetime despite considerable current flowing directly though a small switch of the sensor. The fluid height sensor includes a float that is pivotally mounted on a housing and that pivots with a shaft that extends into the housing to operate a switch assembly in the housing. The switch assembly includes a switch having a largely stationary contact, and having a moveable switch blade with an outer end that moves forward against the stationary contact and rearward away from the stationary contact. The switch assembly also includes an activator that is moved by pivoting of the shaft, and that causes the outer end of the switch blade to suddenly move, or snap, against and away from the stationary contact. Such snapping minimizes sparks that extend between the switch blade and stationary contact when they are slightly separated, and avoids repeated on-off operation of the switch.

The activator mechanism includes an activation blade with an outer end that is moved forward and rearward by the pivoting shaft. A spring connects the outer end of the activation blade to the outer end of the switch blade. The spring urges the moveable switch blade inwardly to load it in compression and slightly bend it. When the switch blade moves forward, its direction of slight bending reverses and it snaps forward against the stationary contact. The spring is a leaf spring that extends in a loop between the outer ends of the activation and switch blades.

The sensor includes a fixed housing and a float that has opposite arms that are both pivotally mounted on the housing. Only a first of the arms is fixed to the shaft, and the shaft penetrates into only a first side of the housing, so only one moveable shaft seal is required. The shaft extends across the width of the housing and its second shaft side is pivotally mounted in a blind hole in the second side of the housing. The blind hole lies in a trunnion that projects from the second side of the housing, and the second side of the second float arm has a hole that receives the trunnion to pivotally mount the second arm on the housing.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
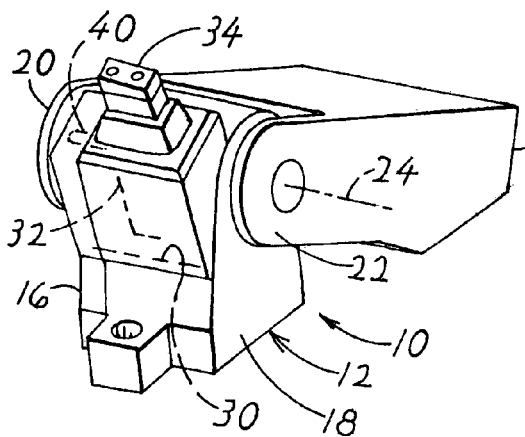
FIG. 1 is an isometric view of a fluid height sensor of the invention.

FIG. 1 shows a fluid height sensor 10 of the invention which includes a fixed housing 12 and a float 14 that is pivotally mounted on first and second sides 16, 18 of the housing. The float pivots by only a limited angle between its raised and lowered positions, and only about 20° between on and off positions of switch in the housing. The float has first and second arms 20, 22 that are each pivotally mounted about a pivot axis 24 on the housing. The housing has a cavity 30 that contains a switch assembly 32 that is operated by pivoting of the float and that controls the flow of current. Electric wires pass through a rubber grommet 34 and connect to an electricity source and consumption device. In one application, the sensor is used to sense the water level in a bilge of a boat, and to complete an electric circuit to energize a bilge pump motor when the water level reaches a predetermined upper level and continue until the water level drops to a predetermined lower level. In one application, electricity at 14 volts and up to 20 amperes (with a surge up to 55 amperes) passes though the sensor.

Figure 5:
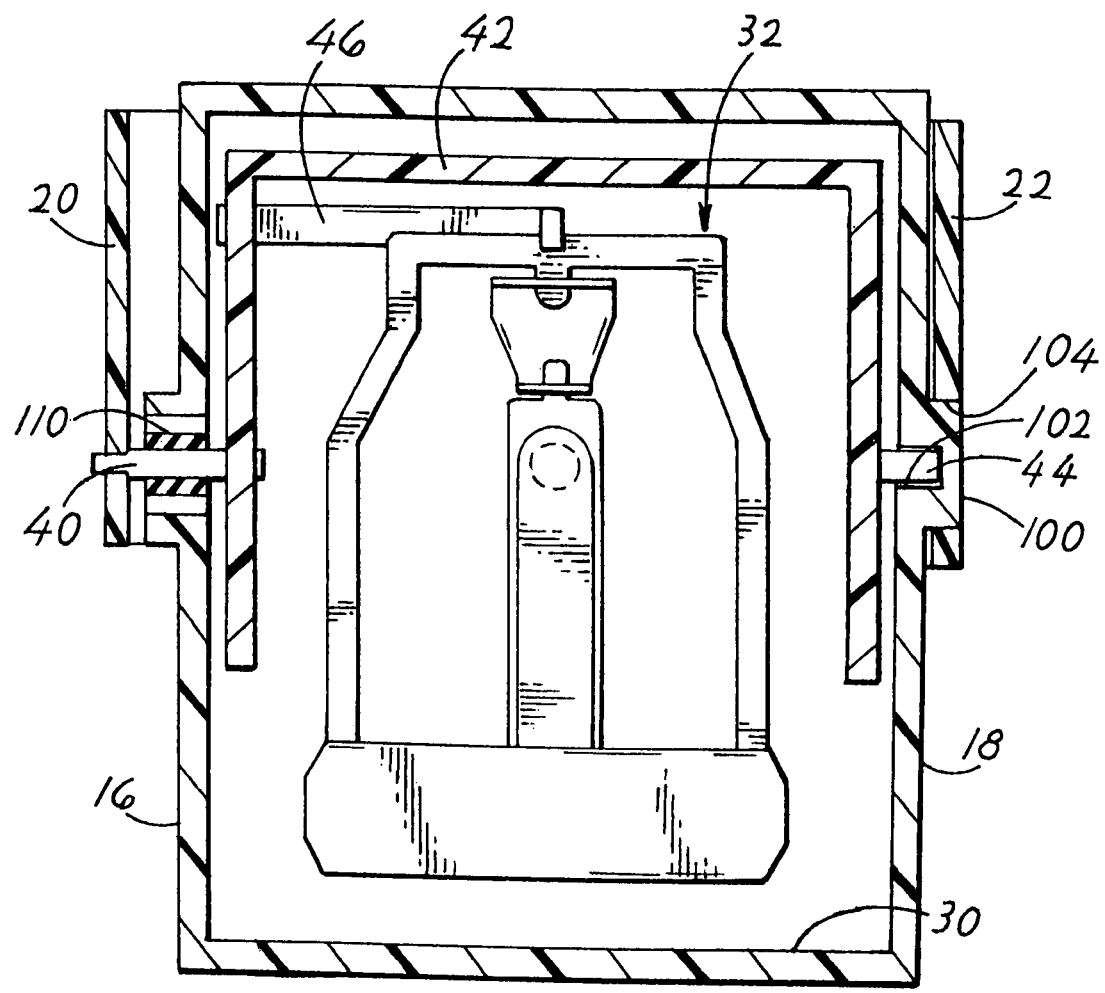
FIG. 5 is a sectional front view of the fluid height sensor of FIG. 1.

FIG. 5 shows that the first float arm 20 is fixed to a float shaft 40 that extends into the housing cavity 30. In the housing cavity, the shaft includes portions 42 that extend around the switch assembly 32, with a second end 44 of the shaft mounted on the second side of the housing. The shaft is connected to the switch assembly by a shaft-to-activator connector 46.

Figure 2:
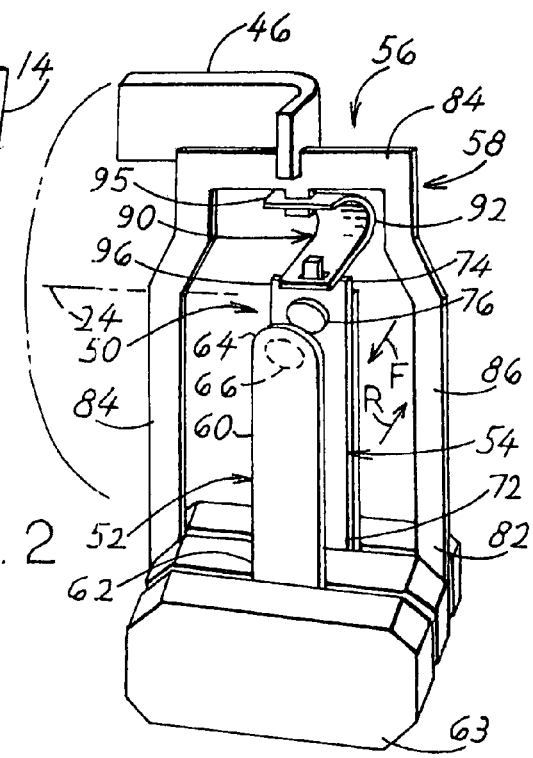
FIG. 2 is a rear isometric view of the switch assembly of the fluid height sensor of FIG. 1.

FIG. 2 shows that the switch assembly includes a switch 50 with a largely stationary contact 52 and a moveable switch blade 54, and also includes an activator 56 that includes an activation blade 58. The stationary contact 52 includes a blade 60 with an inner end 62 that is fixed to a blade mount 63, and with an outer end 64 that carries a contact button 66. The term "primarily stationary" means that the contact is not actively moved but that it may move rearward slightly when pushed rearward. The switch blade 54 is in the form of a blade with an inner end 72 that is fixed to the blade mount and with an outer end 74 that carries a contact button 76. The switch blade outer end moves forward and rearward F, R against and away from the stationary blade outer end. The provision of a resilient blade to hold the largely stationary contact button 60 allows absorption of forces from sudden snapping and adds to hysteresis that avoids rapid on-off operation of the switch. The activation blade 58 has an inner end 82 formed by a pair of strips 84, 86 that straddle the switch blade and that are also fixed to the blade mount, and the activation blade has an outer end 84. A leaf spring 90 is provided that extends in about a 180° loop 92 and that has opposite outer and inner ends 94, 96 connected respectively to the outer end 84 of the activation blade and to the outer end 74 of the moveable switch blade. Although it would be possible to mount the outer end of the leaf spring directly on the shaft portion 42, the activation blade 58 provides the advantage that it closely positions the leaf spring outer end.

Figure 3:
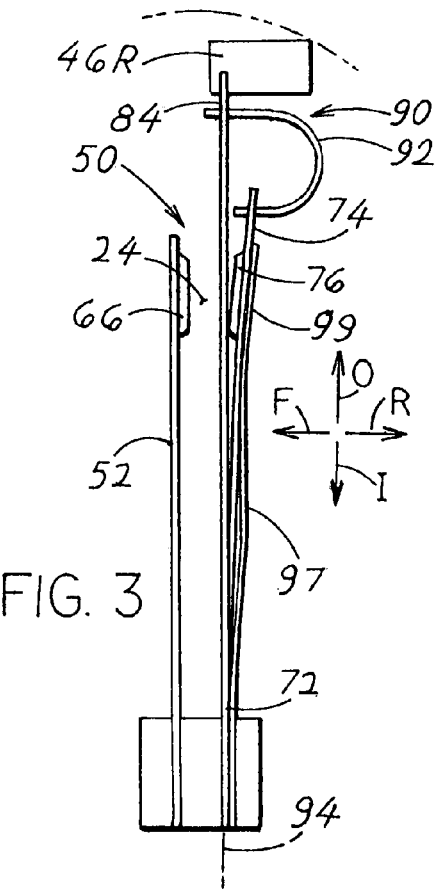
FIG. 3 is a side elevation view of the switch assembly of FIG. 2, in the open position of the switch.

FIG. 3 shows the switch 50 in an open position. The loop 92 of the leaf spring is preloaded to press the outer end 84 of the activation blade outwardly O away from its inner end while pressing the outer end 74 of the moveable switch blade inwardly I towards its inner end 72. The inward force on the switch blade outer end results in compression of the switch blade along its length and in its slight bending. The amount of bending is exaggerated in the figures. In the switch open position of FIG. 3, when the switch has been bent so its outer end lies rearward of the plane 94 of its mounted inner end, the compression force results in the switch blade outer end 74 bending away from the stationary contact 52. When the float rises and the shaft turns, the shaft-to-activator connector 46 moves from the rearward position 46R of FIG. 3 to the forward position 46F of FIG. 4.

Figure 4:
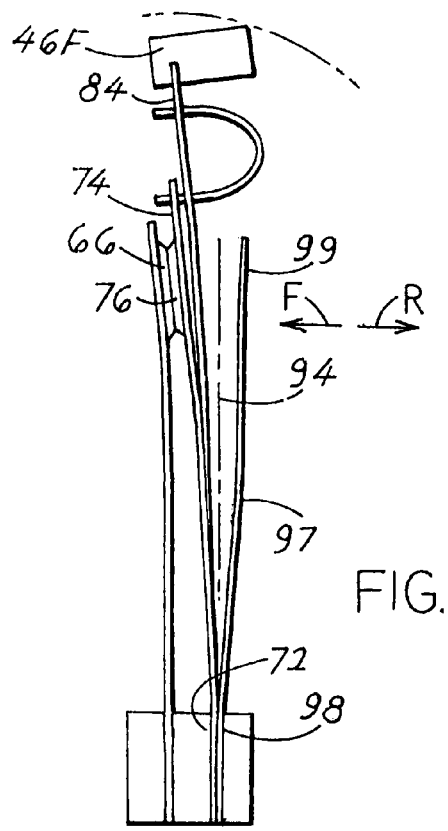
FIG. 4 is a view similar to that of FIG. 3, but in the closed position of the switch.

When the shaft-to-activator connector 46 moves to the forward position of FIG. 4 it moves the outer end 84 of the activation blade forwardly which, through the leaf spring, moves the outer end 74 of the switch blade forwardly. During such forward movement of the switch blade outer end, the curvature of the switch blade reverses from the forwardly-facing concave shape of FIG. 3 to the forwardly-facing convex shape of FIG. 4. During such reversal, the switch blade outer end suddenly snaps forward, and the switch blade button 76 makes sudden contact with the stationary contact button 66. When the connector moves the activation blade rearwardly towards the position of FIG. 3, there is a sudden reversal to the original bending of the switch blade and the switch blade snaps its blade contact button away from the stationary contact button. Applicant provides a stop in the form of a stop blade 97 that prevents the switch blade outer end 74 from moving too far rearward. The stop blade has an inner end 98 held on the blade mount and an outer end 99 that lies rearward of the switch blade outer end. Applicant found that without the stop blade, the switch blade moved too far rearward, requiring too high a force to snap it forward.

When there is a potential difference between the two buttons 76, 66, an arc will extend between the buttons when their separation decreases to a small distance and until they touch. The separation distance required to start an arc depends to a large extent upon the potential difference, which is 14 volts in the earlier example, and the size of the arc partially depends upon the current. The arc is destructive to the buttons, so the period of the arc should be as short as possible. By snapping the switch blade against and away from the stationary contact, applicant minimizes the period of the arcs. It is possible to provide a sensor in the housing that controls a separate switch, but this complicates the circuit and increases its cost and complexity. The snapping of contacts also provides hysteresis that assures that the switch will remain closed until the float moves down considerably, to prevent repeated on-off operation.

FIG. 5 shows that the float shaft 40 penetrates only a first side 16 of the housing. However, the shaft 40 is pivotally mounted on both sides 16, 18 of the housing because the second end 44 of the shaft is pivotally mounted on the housing second side. The housing second side is formed with a trunnion 100 and with a blind hole 102 that is part of the housing cavity and that extends into the trunnion, with the shaft second end pivotally mounted in the blind hole. As mentioned earlier, the first arm 20 of the float is fixed to the shaft 40 to pivotally support the first arm of the float. The second arm 22 of the float has a hole 104 that receives the trunnion to pivotally mount the second arm on the housing. The above arrangement results in only one seal 110 for sealing to a pivoting shaft, being required to seal the housing, this being an elastomeric seal that seals against the shaft. By eliminating the need for a second seal, the possibility of leakage past a seal is greatly reduced.

Thus, the invention provides a fluid height sensor of a type that includes a float pivotally mounted on a housing that contains a switch assembly, which minimizes sparking and minimizes leakage of fluid into the housing, in a low cost and simple sensor. The switch assembly includes an activation blade that is coupled to the outer end of a switch blade by a leaf spring that compresses the switch blade. This causes the switch blade to snap against and away from a stationary blade as the outer end of-the switch blade is moved forward and rearward.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid height sensor which includes a housing having a housing cavity, a float that has a float shaft that is pivotally mounted on said housing and that has a shaft inner end that lies in said housing cavity, and a switch assembly that lies in said housing cavity and that is closed when said float rises to a predetermined level, said switch assembly including a first contact and a switch blade with an inner end fixed to said housing and an outer end that is moveable forward against said first contact and rearward away from said first contact, said shaft inner end being coupled to said switch blade outer portion to move it forward and rearward, including:

a third blade that has an inner end fixed to said housing at a location adjacent to said switch blade inner end and that has a third blade outer portion, and a spring that extends between said third blade outer portion and said switch blade outer portion and that biases said switch blade outer portion towards said switch blade inner end;

said shaft inner end is coupled to said third blade outer portion to move said third blade outer portion forward and rearward, and through said spring to move said switch blade outer portion forward and rearward while inwardly biasing said switch blade outer portion.

2. The sensor described in claim 1 wherein:
   said spring is a leaf spring that is bent into a loop and that has opposite leaf spring ends that are biased apart and connected respectively to a location on said switch blade outer portion and to a location on said third blade outer portion that lies outward of said location on said switch blade outer portion.

3. A fluid height sensor which includes a housing having first and second opposite housing sides and having a housing cavity, a float that has first and second float arms lying on said opposite sides of said housing with each of the float arms pivotally connected to the opposite sides of the housing, and a switch lying in said housing cavity including:
   a shaft that is fixed to said first float arm, said housing first side having a through hole and said shaft extends through said through hole into said housing cavity and is rotatably sealed to the walls of said housing, and a portion of said shaft in said housing cavity is coupled to said switch to operate it;

said housing second side being devoid of a through hole and said shaft has a second end opposite said first float arm that lies entirely in said housing cavity.

4. The sensor described in claim 3 wherein:

said housing second side has an outward projection that forms a trunnion on the outside of said housing second side, said trunnion having a blind hole connected to said housing cavity, said second float arm having a hole that receives said trunnion, and said shaft second end is pivotally mounted in said blind hole.

5. The sensor described in claim 3 wherein:

said switch includes three blades that each has an inner end mounted on said housing and an outer end, said shaft is coupled to said third blade outer end to move the third blade forward and rearward as said shaft pivots by a limited angle in first and second directions, and said third blade is coupled to the outer end of said second blade to bias said second blade outer end inwardly toward said second blade inner end and to move said second blade forward against said first blade and rearward away from said second blade.

6. A fluid height sensor which includes a housing having a housing cavity, a float that has a float shaft that is pivotally mounted on said housing to pivot by a limited angle, said float shaft penetrating into said housing cavity, a switch in said housing cavity, and activator means that lies in said housing cavity and that is connected to said shaft and that closes said switch when said float reaches a predetermined level, wherein:

said switch includes a first contact and a moveable switch blade, said switch blade having a fixed inner end fixed to said housing and having an outer end that is moveable in forward and rearward directions against and away from said first contact;

said activator means is coupled to said float shaft to move primarily forward and rearward as said float shaft pivots within said limited angle, and said activator means is coupled to said outer end of said switch blade to resiliently press said outer end of said switch blade inward toward the fixed end while moving said outer end of said switch blade forward and rearward, to thereby snap said outer end of said switch blade forward against said first contact and rearward away from said first contact as said shaft pivots;

said float has laterally opposite side arms, including a first side arm that is fixed to a first end of said float shaft and a second side arm that is pivotally mounted on said housing but that does not directly engage said shaft, said float shaft having a second end lying opposite said shaft first end, said second shaft end being pivotally mounted on said housing and lying completely in said housing cavity so said second shaft end does not penetrate said housing.

7. A fluid height sensor which includes a housing having a housing cavity, a float that has a float shaft that is pivotally mounted on said housing to pivot by a limited angle, said float shaft penetrating into said housing cavity, a switch in said housing cavity, and activator means that lies in said housing cavity and that is connected to said shaft and that closes said switch when said float reaches a predetermined level, wherein:

said switch includes a first contact and a moveable switch blade, said switch blade having a fixed inner end fixed to said housing and having an outer end that is moveable in forward and rearward directions against and away from said first contact;

said activator means is coupled to said float shaft to move primarily forward and rearward as said float shaft pivots within said limited angle, and said activator means is coupled to said outer end of said switch blade to resiliently press said outer end of said switch blade inward toward the fixed end while moving said outer end of said switch blade forward and rearward, to thereby snap said outer end of said switch blade forward against said first contact and rearward away from said first contact as said shaft pivots;

said activator means includes an activation blade with an inner end fixed to said housing and with an outer end that is coupled to said shaft so as said shaft pivots in first and second directions the shaft moves said outer end of said activation blade forward and rearward, said activator means also including a spring that extends between said outer end of said activation blade and said outer end of said switch blade and that presses said outer end of said activation blade outward and presses said outer end of said switch blade inward toward the fixed end.

8. The sensor described in claim 7 wherein:

said spring is a leaf spring that has opposite spring ends, including a first spring end connected to said outer end of said activation blade and a second spring end connected to said outer end of said contact blade, said leaf spring being preloaded so said second spring end is biased away from said first spring end and so said second spring end biases said outer end of said contact blade inward toward the fixed inner end.

9. The sensor described in claim 7 wherein;

said activation blade and said switch blade are each formed of sheet metal, said switch blade having parallel opposite sides extending between the inner and outer ends of the switch blade, and said activation blade includes a pair of parallel arms that extend primarily parallel to and that lie beyond said opposite sides of said switch blade, said parallel arms of said activation blade straddling said switch blade.

10. A fluid height sensor which includes a housing having a housing cavity, a float that has a float shaft that is pivotally mounted on said housing to pivot by a limited angle, said float shaft penetrating into said housing cavity, a switch in said housing cavity, and activator means that lies in said housing cavity and that is connected to said shaft and that closes said switch when said float reaches a predetermined level, wherein:

said switch includes a first contact and a moveable switch blade, said switch blade having a fixed inner end fixed to said housing and having an outer end that is moveable in forward and rearward directions against and away from said first contact;

said activator means is coupled to said float shaft to move primarily forward and rearward as said float shaft pivots within said limited angle, and said activator means is coupled to said outer end of said switch blade to resiliently press said outer end of said switch blade inward toward the fixed end while moving said outer end of said switch blade forward and rearward, to thereby snap said outer end of said switch blade forward against said first contact and rearward away from said first contact as said shaft pivots; and including a stop blade with a fixed inner end and with a stop blade outer end that lies rearward of said switch blade outer end and which abuts said switch blade outer end when said switch blade outer end moves rearward.

* * * * *